US 6,748,502 B2
Jun. 8, 2004

(12) United States Patent
Watanabe et al.

(10) Patent No.: US 6,748,502 B2
(45) Date of Patent: Jun. 8, 2004

(54) VIRTUAL VOLUME STORAGE

(75) Inventors: Naoki Watanabe, Sunnyvale, CA (US); Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 418 days.

(21) Appl. No.: 09/760,344

(22) Filed: Jan. 12, 2001

(65) Prior Publication Data
US 2002/0095547 A1 Jul. 18, 2002

(51) Int. Cl.[7] .............................................. G06F 13/00
(52) U.S. Cl. ........................ 711/158; 711/118; 709/217
(58) Field of Search ................................. 711/158, 167, 711/151, 118; 709/219, 225, 229, 217

(56) References Cited

U.S. PATENT DOCUMENTS

| | | | | |
|---|---|---|---|---|
| 4,821,172 A | * | 4/1989 | Kaneko et al. ................. 710/5 |
| 5,155,835 A | | 10/1992 | Belsan ......................... 395/425 |
| 5,210,872 A | * | 5/1993 | Ferguson et al. ............ 709/102 |
| 5,218,686 A | * | 6/1993 | Thayer ......................... 711/100 |
| 5,333,312 A | * | 7/1994 | Wang ............................ 707/10 |
| 5,410,700 A | * | 4/1995 | Fecteau et al. .............. 709/100 |
| 5,901,228 A | * | 5/1999 | Crawford ....................... 705/34 |
| 5,909,696 A | * | 6/1999 | Reinhardt et al. ........... 711/144 |
| 5,938,775 A | * | 8/1999 | Damani et al. ................ 714/15 |
| 6,021,476 A | * | 2/2000 | Segars ......................... 711/163 |
| 6,128,689 A | * | 10/2000 | Hassbjer et al. ............. 710/305 |
| 6,463,284 B2 | * | 10/2002 | Nakamura et al. .......... 455/433 |
| 6,591,376 B1 | * | 7/2003 | VanRooven et al. .......... 714/36 |
| 2002/0059539 A1 | * | 5/2002 | Anderson ....................... 714/6 |

OTHER PUBLICATIONS

Carnegie Mellon University, Dept. Of Electrical & Computer Engineering, "IP Storage (IPS)", date unknown, web page at http://www.ece.cmu.edu/~ips/index.html.

Julian Satran et al., "iSCSI", Dec. 30, 2000, web page at http://www.ietf.org/internet–drafts/draft–ietf–ips–iscsi–02.txt.
M. Krueger, et al., "iSCSI Requirements and Design Considerations," Nov. 2000, web page at http://www.ietf.org/internet–drafts/drafts/draft–ietf–ips–iscsi–reqmts–oo.txt.
IETF, "The Internet Engineering Task Force," date unknown, web page at http://www.ietf.org.
Computer Network Technology Corporation ("CNT"), CNT web page, copyright 2001, web page at http://www.cnt.com.
Computer Network Technology Corporation, "World's First Transatlantic Implementation of True Data Mirroring: Ultranet Success Story," copyright 2000.
Computer Network Technology Corporation, "EchoStar Readies for Rapid Growth with SAN Solutions from CNT" copyright 2001.
Computer Network Technology Corporation, "Data Replication Over IP Networks: White Paper," copyright 2001, pp. 1–11.
ADVA Limited, "Unlimited Storage Networking," copyright 1998, 1999, 2000, web page at http://www.san.com.
CIFS, CIFS web page, date unknown, web page at http://www.cifs.org.

* cited by examiner

*Primary Examiner*—Hong Kim
(74) *Attorney, Agent, or Firm*—Squire, Sanders & Dempsey L.L.P.

(57) ABSTRACT

A system for providing a data storage service, comprises: a service provider site configured to provide a data storage service; and a user site coupled by a wide area network (WAN) to the service provider site, the user site comprising a local storage having a virtual storage, the virtual storage having a synchronous volume and an asynchronous volume, the local storage configured to immediately transmit to the service provider site data that is written in the synchronous volume, to transmit at a predetermined schedule to the service provider site data that is written in the asynchronous volume, and to read data from the service provider site if the data is not stored in the local storage.

2 Claims, 9 Drawing Sheets

Configuration Table 112

| ID | Interface | Sub Area | Remote Site | Remote ID | Volume Type | Service | | Size (GB) | | | Policy |
|---|---|---|---|---|---|---|---|---|---|---|---|
| | | | | | | Back Up | Analyze | Total | Used | Free | |
| 00 | SCSI | None | 1 | 10 | Static | Remote Copy | Null | 20 | | | Null |
| 01 | SCSI | None | 1 | 11 | Static (Async) | None | Ptr | 20 | | | Null |
| 02 | NFS | 3 | 1 | 12 | Cache (Async) | Remote Copy | Ptr | 100 | 50 | 50 | Week |
| 03 | CIFS | None | 1 | 13 | Cache | None | Ptr | 50 | 30 | 20 | Day |

Statistical Information

| ID | Sub Area | IO/s | | | | MB/s | | | | Hit Ratio | Log Ptr |
|----|----------|------|------|------|------|------|------|------|------|-----------|---------|
|    |          | Read | | Write | | Read | | Write | | | |
|    |          | Ave | Max | Ave | Max | Ave | Max | Ave | Max | | |
| 00 |          |      |      |      |      |      |      |      |      |           |         |
| 01 |          | 15 | 100 | 3 | 25 | 0.12 | 2.0 | 0.02 | 0.5 | 80% | Null |
| 02 | /usra |      |      |      |      |      |      |      |      |           | ptr ← 500 |
|    | /usrb |      |      |      |      |      |      |      |      |           | Null ← 505 |
|    | /usrc |      |      |      |      |      |      |      |      |           | Null ← 510 |

Access Log 114

| Date | Time | Command | File ID | Address | Size |
|---|---|---|---|---|---|
| 2000.8.1 | 0:0:0 | Read | 0 | 0x0000 | 0x0001 |
| 2000.8.1 | 0:0:0 | Write | 0 | 0x0000 | 0x0001 |
| 2000.8.1 | 0:0:1 | Read | 10 | 0x0100 | 0x0100 |
| 2000.8.1 | 0:0:1 | Read | 10 | 0x0200 | 0x0100 |
| 2000.8.1 | 0:0:2 | Read | 10 | 0x0200 | 0x0100 |
| 2000.8.1 | 0:0:2 | Read | 10 | 0x0300 | 0x0100 |
| 2000.8.1 | 0:0:2 | Read | 10 | 0x0400 | 0x0100 |

FIG. 6

VIRTUAL VOLUME STORAGE

FIELD OF THE INVENTION

The present invention relates to data storage systems, and relates more particularly to a system and method for providing a virtual volume data storage in a user site.

BACKGROUND OF THE INVENTION

Managing a large data storage system is very difficult. Typically, a data storage service provider provides a storage-related service such as providing storage volumes, data backup, and the like. From a user site, if a user connects to this storage via the storage service provider's directory, then the user must use a long distance connection to connect to this storage. This process causes more delays than if a user is connecting to a local storage.

The World Wide Web (WWW) effectively acts as a storage system in a wide area. The user may deploy a proxy server in the user site. As known to those skilled in the art, a proxy server is a server that sits between a client application (such as a web browser) and a remote server. The proxy server provides a cache of items that are available on the remote servers. The proxy server intercepts all requests that are made to the remote server so that the proxy server can determine if it can instead fulfill the request. If the proxy server is unable to fulfill the request, then the proxy server will forward the request to the remote server for processing. A proxy server can just only read cache data from the remote server or site, and it does not support a write procedure to the remote server or site. Additionally, the proxy server can not provide a service that depends on the data feature. As a result, the proxy server causes an ineffective usage of resources, and the use of a proxy server also causes more delays than the use of a local storage.

U.S. Pat. No. 5,155,835 discloses a multilevel, hierarchical, dynamically mapped data storage subsystem. This patent reference does not disclose storage systems between wide area networks (WANs) and ignores data features such as access interface type (block or file, and the like), purpose (user data or system file or backup file and the like). Thus, the subsystem disclosed in this reference is inefficient.

The Internet protocol small computer system interface (iSCSI) uses the Internet Protocol (IP) networking infrastructure to quickly transport large amounts of block storage (SCSI) data over existing local area and/or wide area networks. With the potential to support all major networking protocols, iSCSI (IP SAN) can unify network architecture across an entire enterprise, thereby reducing the overall network cost and complexity. To ensure reliability, iSCSI can use known network management tools and utilities that have been developed for IP networks. The iSCSI protocol is discussed, for example, at the website, http://www.ece.cmu.edu/~ips/index.html) in the IP Storage section, http://www.ece.cmu.edu/~ips/Docs/docs.html.

The working group of Internet Engineering Task Force (IETF) at http://www.ietf.org provides a network file system (NFS) version 3 (rfc1813 of IETF) and a common Internet File system (CIFS) protocol (http://www.cifs.org).

The NFS is an open operating system that allows all network users to access shared files that are stored in different types of computers. NFS provides access to shared files through an interface called Virtual File System (VFS) which runs on top of the Transmission Control Protocol/Internet Protocol (TCP/IP). With NFS, computers connected to a network can operate as clients while accessing remote files and as servers while providing remote users access to local shared files.

The CIFS protocol defines a standard for remote file access using millions of computers at a time. With CIFS, users with different platforms and computers can share files without having to install new software. CIFS runs over TCP/IP, but uses the Server Message Block (SMB) protocol found in Microsoft Windows for file and printer access. Therefore, CIFS will allow all applications (including Web browsers) to open and share files across the Internet.

The websites http://www.cnt.com and http://www.san.com describe wide area network (WAN) connections to a storage or storage area networks (SANs). The WAN connection may be an asynchronous transfer mode (ATM), synchronous optical network SONET), and the like.

The above references do not disclose methods for providing hierarchical management techniques between storage systems and host devices.

There is a need for a system and method that will overcome the above-mentioned deficiencies of conventional methods and systems. There is also a need for a system and method that will permit an access service provider to have a reliable storage system and that will permit a user to quickly access the storage system. There is also a need for a system and method that will permit an access service provider to be able to tune a local storage system based upon user statistic data and user log data.

SUMMARY

The present invention may advantageously provide a reliable virtual local storage in a user site. The present invention may also advantageously provide a virtual local storage that permits faster access for a user. The present invention may also advantageously permit a service provider to tune up the local storage by using user statistics data and user log data that are tracked by the local storage, and the service provider may then charge the user for these tuning services.

In one embodiment, the present invention permits a service provider to provide a data storage service via a wide area network. A virtual volume storage is deployed at the user site. The virtual volume storage allows a host(s) at the user site to access the service provider storage located at the service provider site. The virtual volume storage advantageously permits the user to avoid having to access each time the wide area network coupled between the user site and the service provider site.

In one embodiment, the present invention broadly provides a system for providing a data storage service, comprising: a service provider site configured to provide a data storage service; and a user site coupled by a wide area network (WAN) to the service provider site, the user site comprising a local storage having a virtual storage, the virtual storage having a synchronous volume and an asynchronous volume, the local storage configured to immediately transmit to the service provider site data that is written in the synchronous volume, to transmit at a predetermined schedule to the service provider site data that is written in the asynchronous volume, and to read data from the service provider site if the data is not stored in the local storage.

In another embodiment, the present invention provides a method of managing data in a local storage based on the data feature. The virtual volume storage in the local storage determines if the data is static or cached, and synchronous or asynchronous. The virtual volume storage can also manage data not only by storage volume, but also by directory, file, cylinder, and/or block address.

In another embodiment, the present invention provides a method of tracing the access activities of a user in the user site. The user access activities are recorded to permit the service provider to analyze patterns in the user access activities. Based on this analysis, the service provider can tune the virtual volume storage in the user site.

BRIEF DESCRIPTION OF THE DRAWINGS

FIG. 4 is a block diagram of an example of a configuration table in accordance with an embodiment of the present invention;

FIG. 5 is a block diagram of an example of statistical information in accordance with an embodiment of the present invention;

FIG. 6 is a block diagram of an example of an access log in accordance with an embodiment of the present invention;

DETAILED DESCRIPTION OF THE PREFERRED EMBODIMENTS

Figure 1:
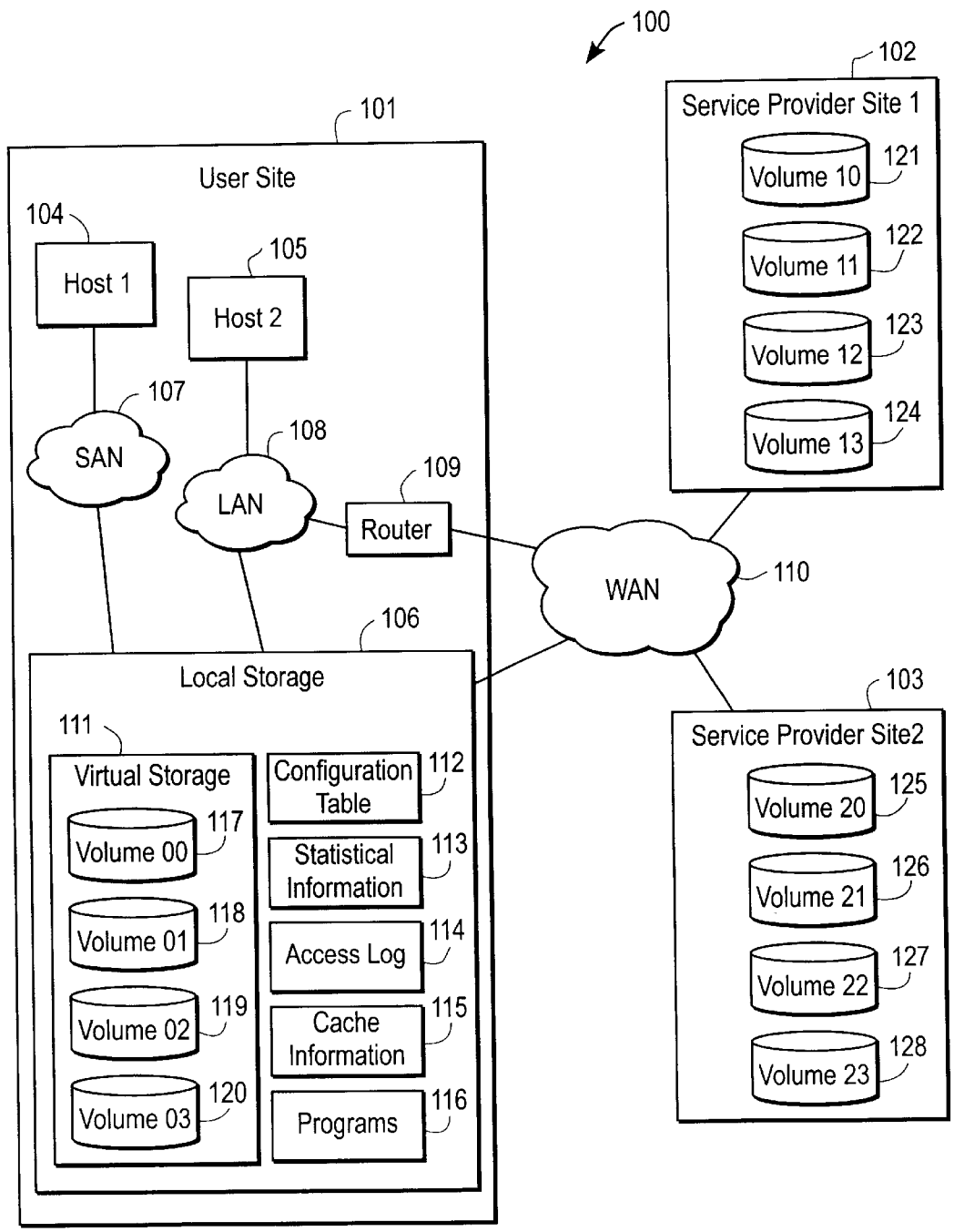
FIG. 1 is block diagram of a system in accordance with an embodiment of the present invention.

The following description is provided to enable any person skilled in the art to make and use the present invention, and is provided in the context of a particular application and its requirements. Various modifications to the embodiments will be readily apparent to those skilled in the art, and the generic principles defined herein may be applied to other embodiments and applications without departing from the spirit and scope of the present invention. Thus, the present invention is not intended to be limited to the embodiments shown, but is to be accorded the widest scope consistent with the principles, features, and teachings disclosed herein.

In one embodiment in accordance with the present invention, a system 100 is configured by a user site 101, and by a first service provider site 102 and a second service provider site 103. The details of the user site 101 is described below. The number of service provider sites in the system 100 may vary. The first service provider site 102 includes storage volumes 121, 122, 123, and 124, while the second service provider site 103 includes storage volumes 125, 126, 127, and 128. The number of storage volumes in a service provider site may vary. The service provider sites 102 and 103 may be located in, for example, two different safe buildings. The user site 101, first service provider site 102, and second service provider site 103 are each connected to a Wide Area Network (WAN) 110. The service providers 102 and 103 provide data storage services via the WAN 110 to a user at the user site 101.

As known to those skilled in the art, a WAN is a computer network that typically spans a relatively large geographical area. A WAN may also include local area networks (LANs). Computers connected to a WAN are often connected through public networks, such as the telephone system. They can also be connected through leased lines or satellites. The largest WAN in existence is the Internet.

The WAN 110 permits communication between each site (user site 101 and service provider sites 102 and 103). Each site 101, 102, and 103 may be separated from each other by long distances. The WAN 110 is typically configured by asynchronous transfer mode (ATM), synchronous optical network (SONET), Dense Wavelength Division Multiplexing (DWDM), or Internet Protocol (IP) network.

At the user site 101, a first host 104 is connected to a local storage 106 via a storage area network (SAN) 107, while a second host 105 is connected to the local storage 106 via a local area network (LAN) 108. The hosts 104 and 105 access the local storage 106. The hosts 104 and 105 are, for example, servers. The number of hosts in the user site 101 may vary. The LAN 108 is connected to the WAN 110 via, for example, a router 109. From the teachings of the present invention herein, it is understood by those skilled in the art that the user site 101 may be implemented to include only one of the SAN 107 or LAN 108, or both the SAN 107 and LAN 108.

As known to those skilled in the art, a SAN is a high-speed sub-network of shared storage devices wherein the SAN makes all storage devices available to all servers in a LAN or WAN. As more storage devices are added to a SAN, these added storage devices will also be accessible from any server in the larger network.

The SAN 107 may be configured with, for example, fibre channel or Small Computer System Interface (SCSI). As known to those skilled in the art, a fibre channel is a serial data transfer architecture developed by a consortium of computer and mass storage device manufacturers and now being standardized by the American National Standards Institute (ANSI). The most prominent fibre channel standard is the Fibre Channel Arbitrated Loop (FC-AL) which is designed for new mass storage devices and other peripheral devices that require a very high bandwidth. Using optical fibers to connect the devices, FC-AL supports full-duplex data transfer rates of approximately 100 megabytes per second (MBps).

As also known to those skilled in the art, SCSI is a parallel interface standard used by Apple Macintosh computers, personal computers (PCs), and many UNIX systems for attaching peripheral devices to computers. SCSI interfaces provide for faster data transmission rates (up to about 80 MBps) than standard serial and parallel ports.

As also known to those skilled in the art, a LAN is a computer network that typically spans a relatively small area. Most LANs are confined to a single building or group of buildings. Most LANs connect workstations and personal computers. Each node (individual computer) in a LAN has its own central processing unit (CPU) with which it executes programs, but it is also able to access data and devices anywhere on the LAN. Thus, many users can share expensive devices, such as laser printers, as well as data. Users can also use the LAN to communicate with each other, by, for example, sending e-mail or engaging in chat sessions. There are many different types of LANs, with Ethernets being the most common for PCs. LANs are capable of transmitting data at very fast rates, much faster than the data transmitted over a telephone line. However, the distances over LANs are limited, and there is also a limit on the number of computers that can be attached to a single LAN.

In FIG. 1, the LAN 108 is configured as, for example, an Ethernet.

The first host 104 accesses the local storage 106 by use of, for example, a block (SCSI) interface (I/F). The second host 105 accesses the local storage 106 by, for example, a file (NFS or CIFS) I/F. The second host 105 may also access the local storage 106 by, for example, a block (iSCSI) I/F.

The local storage 106 and service provider sites 102 and 103 may use iSCSI or fiber channel over ATM, fiber channel over SONET, or a unique vendor protocol.

The local storage 106 includes a virtual storage 111, configuration table 112 (see also FIG. 4), statistical information 113 (see also FIG. 5), access log 114 (see also FIG. 6), cache information 115, and programs 116. The components 112, 113, 114, 115, and 116 permit the local storage 106 to act like a cache. The hosts 104 and 105 can access the virtual storage 111. The virtual storage 111 includes some volumes 117, 118, 119, and 120. The number of volumes in the virtual storage 111 may vary. These volumes 117–120 are managed by the local storage 106. The local storage 106 and service provider sites 102 and 103 collaborate for creation of the virtual volume storage 111.

The user can deploy the virtual volume storage 111 (in local storage 106) at the user site 101. The virtual volume storage 111 allows the users of host 104 and/or host 105 to access the huge service provider storage (volumes 121–124 and/or volumes 125–128) as the virtual volume storage 111 is deployed at the user site 101. The virtual volume storage 111 typically has a smaller size than the service provider storage volumes (volumes 121–124 and/or volumes 125–128). The virtual volume storage 111 has several interfaces such as, for example, a block I/F (SCSI), file I/F (NFS, CIFS) as discussed below. The virtual volume storage 111 advantageously permits the user to avoid in having to access the WAN 110 every time. The virtual volume storage 111 also enables the service provider to provide a faster and more reliable storage system for the user.

Figure 2:
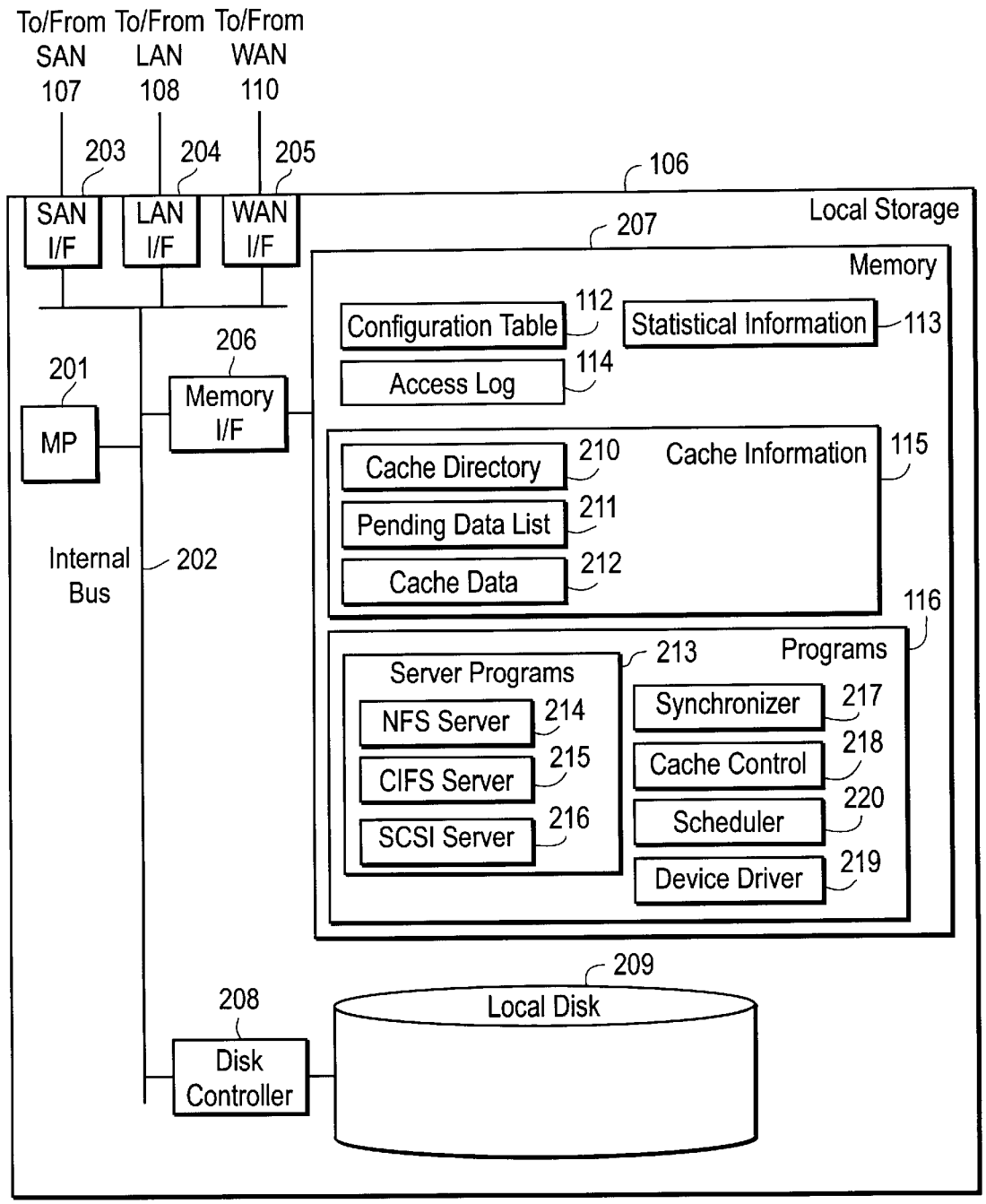
FIG. 2 is a block diagram showing additional details of one embodiment of the local storage in FIG. 1.

FIG. 2 is a block diagram showing the details of one embodiment of the local storage 106. The local storage 106 includes a microprocessor 201 (which is available from, for example, Intel Corporation or Motorola Corporation), a local (internal) bus 202, a SAN interface (I/F) 203 coupled to the SAN 107 (FIG. 1), a LAN I/F 204 coupled to the LAN 108 (FIG. 1), a WAN I/F 205 coupled to the WAN 110 (FIG. 1), a memory I/F 206, a memory 207, a disk controller 208, and a local disk 209. The memory 207 contains the configuration table 112, statistical information 113, access log 114, cache information 115, and programs 116. The microprocessor 201 controls all resources in the local storage 106 and executes all procedures in the local storage 106 by using the programs 116.

FIG. 2 shows a snapshot of the local disk 209 during the running of procedures in the local storage 106. As known to those skilled in the art, a snapshot is a copy of a whole volume or a part of a volume of a real storage. These information and programs shown in FIG. 2 are stored in the local disk 209. At the boot sequence of local storage 106, these data and programs are moved from the local disk 209 to the memory 207.

The cache information 115 is configured with cache directory 210, pending data list 211, and cache data 212. The cache directory 210 is a directory (configuration information) of the cached data 212 in memory 207 and local disk 209. This cache data 212 may be managed by the least recently used (LRU) management. But some cases should be an exception of the LRU management, because there will be no possibility to access again in the near future. One such exception is sequential access where the storage address is accessed in a sequential manner.

The pending data list 211 is a list of pending data which is saved in the local storage 106. The pending data list 211 has information of each pending data such as a pointer to pending data, a pointer to a service provider site, and a synchronous period. A synchronous period is defined by the data feature. If the data is not important, then this data may be stored in the local storage 106 for a predetermined period. This period may be, for example, one minute, one hour, one day, one week, or one month. If the data is important, then after the data is stored in the virtual storage 111, the data should be stored immediately (synchronous) in a service provider site (e.g., site 102) by using the configuration table 112 (FIG. 4). For example, synchronous data is stored in Volume 00 117. In FIG. 4, Volume 00 117 is identified with the identification number ID 00. Since the data stored in Volume 00 117 is synchronous data, the data will be immediately stored in the service provider site1 102 (Remote Site 1) at Volume 10 121 (Remote ID 10).

This synchronous access feature provides a reliable data storage system. However, synchronous access requires much time because of the access time by the user site 101 to the service provider sites 102 and/or 103. The required access time depends on the particular operation being carried out on the system 100.

Data that are accessed by hosts 104 and/or 105 are stored in the memory 207. This data is called cache data 212. Cache data 212 is a temporary data that is frequently accessed by a user of host 104 and/or host 105.

In one embodiment, the programs 116 include server programs 213, a synchronizer 217, a cache control 218, a scheduler 220, and a device driver 219. The server programs 213 permit the local storage 106 and the host 104 (and/or host 105) to communicate with each other. The server programs 213 are configured with an NFS server 214, a CIFS server 215, and an SCSI server 216. The NFS server 214 acts as a conventional NFS server. The CIFS server 215 acts as a conventional CIFS server. The SCSI server 216 acts as an SCSI target device. The synchronizer 217 synchronizes the local storage 106 and the service provider sites 102 and/or 103 by using the pending data list 211. The cache control 218 controls cache data 212 in the memory 207 and local disk 209 by using the cache directory 210. The scheduler 220 schedules all procedures such as the server programs 213, synchronizer 217, cache control 218, and device driver 219. The device driver 219 controls all devices in local storage 106 such as the SAN I/F 203, the LAN I/F 204, the WAN I/F 205, the memory I/F 206, and the disk controller 208.

Figure 3:
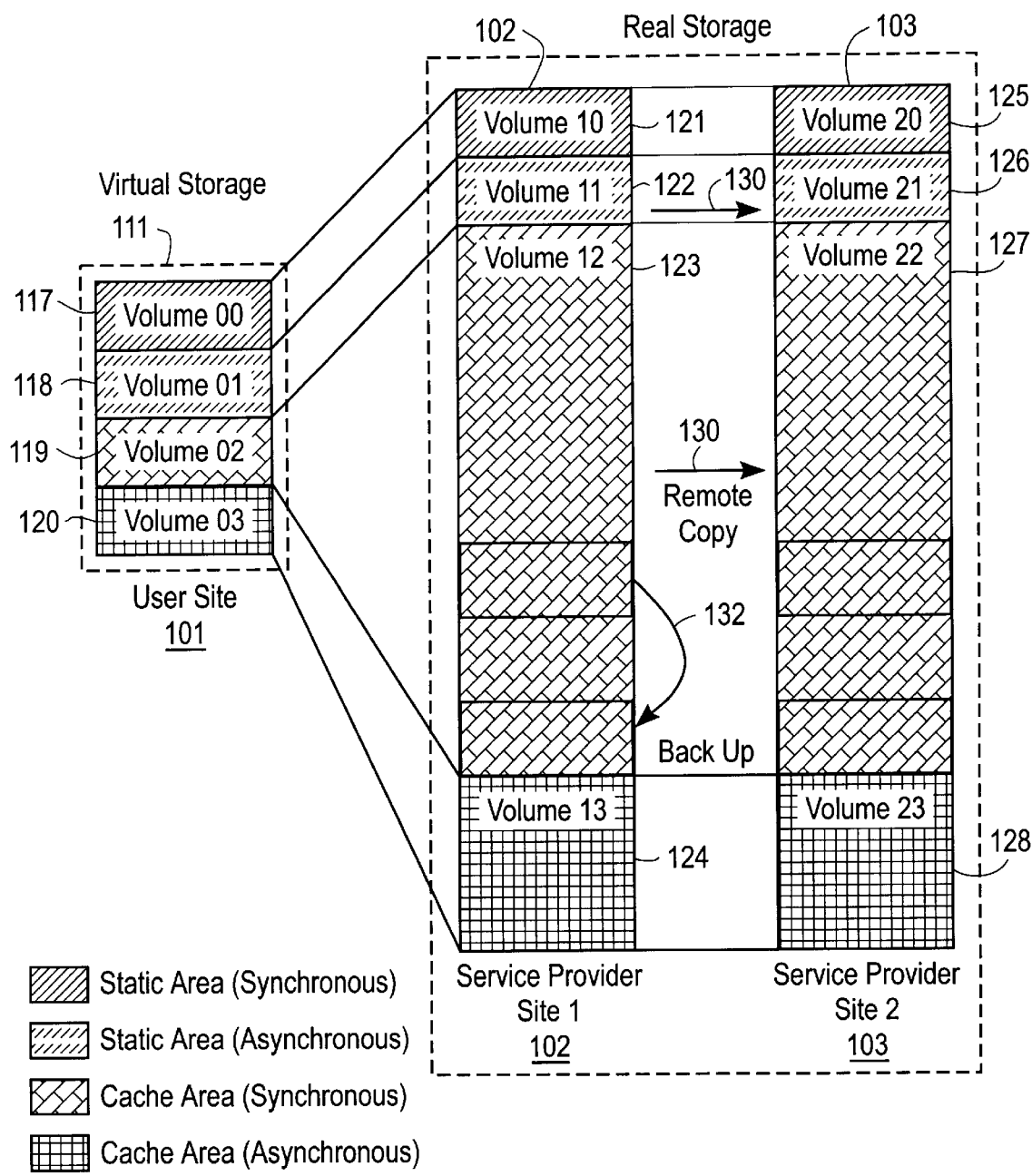
FIG. 3 is a block diagram showing one example of a data layout in accordance with an embodiment of the present invention.

FIG. 3 is a block diagram showing one example of a data layout in accordance with an embodiment of the present invention. The management of the local storage 106 is based upon the use of data feature, as described below in additional details. The virtual volume storage 111 deals with the data feature, depending on whether the data is static or cached, synchronous or asynchronous. As also described further below, the virtual volume storage 111 can deal with data feature not only by storage volumes, but also by directory, file, cylinder, and/or block address. At user site 101, there are four (4) types of virtual volumes (Volume 00 117, Volume 01 118, Volume 02 119, and Volume 03 120) in the virtual storage 111. The features of these virtual volumes are described below: (1) the static synchronous volume, (2) the static asynchronous volume, (3) the cached synchronous volume, and (4) the cached asynchronous volume.

(1) The static synchronous volume (Volume 00 117)

Volume 00 117 is a static synchronous volume. Thus, Volume 00 117 occupies the same size as the real storage volume, Volume 10 121, in the first service provider site 102. The hosts 104 and/or 105 (at user site 101) read the data from Volume 00 117 and not from Volume 10 121. If the accessed data is in the cache data cache 212 (FIG. 2), then the local storage 106 (FIG. 2) does not access the local disk 209 (FIG. 2) and just accesses the memory 207. The hosts 104 and/or 105 write data to both Volume 00 117 and Volume 10 121. This static synchronous volume, Volume 00 117, provides a fast read access and reliable storage system.

(2) The static asynchronous volume (Volume 01 118)

Volume 01 118 is a static asynchronous volume. Thus, Volume 001 118 occupies the same size as the real storage volume, Volume 11 122, in the first service provider site 102. The hosts 104 and/or 105 read data from just only Volume 01 118 and not from Volume 11 122. If the accessed data is in the cache data 212, then local storage 106 does not access the local disk 209 and only accesses the memory 207. The hosts 104 and/or 105 write data to Volume 01 118 and register to the pending data list 211 (FIG. 2). This pending data is synchronized with a predetermined schedule, as described below.

This pending data may be compressed in the background job in the local storage 106 (FIG. 2) to reduce the WAN 110 traffic. This static asynchronous volume, Volume 01 118, provides a fast read and write volume, but may not provide the same reliability as a synchronous volume.

(3) The cached synchronous volume (Volume 02 119)

Volume 02 119 is a cached synchronous volume. Thus, Volume 02 119 occupies same size as the real storage volume, Volume 12 123, in the first service provider site 102. Volume 02 119 acts as a cache. Thus, there is no data in Volume 02 119 that is accessed by the hosts 104 and/or 105. If the data is not in the local disk 209 (FIG. 2), then the local storage 106 (FIG. 2) reads data from the first service provider site 102 and writes the read data to the local disk 209. After the data is in the local storage 106, the local storage 106 sends the data from the local disk 209 via memory 207 to the hosts 104 and/or 105. If the accessed data is in the cache data 212, then the local storage 106 does not access local disk 209 and just accesses the memory 207. The hosts 104 and/or 105 write data to Volume 02 119 and Volume 12 123. This cached synchronous volume, Volume 02 119, advantageously permits the reduction of size of the local storage 106. This virtual volume, Volume 02 119, also provides a reliable storage system.

(4) The cached asynchronous volume (Volume 03 120)

Volume 03 120 is a cached asynchronous volume. Thus, Volume 03 120 occupies same size as the real storage volume, Volume 13 124, in the first service provider site 102. Volume 04 120 acts as a cache. Thus there is no data in Volume 03 120 that is accessed by the hosts 104 and/or 105. If the data is not in the local disk 209, the local storage 106 reads data from the first service provider site 102 and writes this read data into the local disk 209. After the data is already in the local storage 106, the local storage 106 sends the data from local disk 209 via memory 207 to the hosts 104 and/or 105. If the accessed data is in the data cache 207, then the local storage 106 does not access local disk 209 and just accesses the memory 207. The hosts 104 and/or 105 write the data to Volume 01 118 and register to pending data list 211 (FIG. 2). This pending data is synchronized with a schedule. This cached asynchronous volume, Volume 03 120, advantageously permits the reduction of size of the local storage 106, but may not provide the same reliability as a synchronous volume.

FIG. 3 also illustrates a service provided by the service provider site. Volume 11 122 in the first service provider site 102 is duplicated on volume 21 126 in the second service provider site 103. Volume 12 123 is duplicated on volume 22 127 in the second service provider site 103. Volume 13 124 is duplicated on volume 23 128 in the second service provider site 103. This duplication (remote copying 130) of volume data provides a disaster recovery method. The volume data may be duplicated by use of, for example, conventional remote mirroring technology. Additionally, at the first service provider site 102, a backup of the data in Volume 12 123 may be made (see arrow 132) without requiring the function of the user site 101. This backup service permits the user to reduce the workload of data back up.

As now discussed below, the virtual volume storage 111 can make a trace data based upon access activities from the hosts 104 and/or 105. The virtual volume storage 111 can provide to the service provider this trace data for purposes of analyzing the user access pattern. After analyzing the user access pattern, the service provider can advantageously tune the virtual volume storage 111.

FIG. 4 is a block diagram of an example of a configuration table 112 in accordance with an embodiment of the present invention. The configuration table 112 is configured with the following parameters: "ID", "Interface", "Sub Area", "Remote Site", "Remote ID", "Volume Type", "Service" ("Backup", "Analyze"), "size" ("Total", "Used", "Free"), and "Policy". ID indicates volume identification of a virtual volume in the local storage 106. For example, Volume 00 117 (FIG. 3) has an ID 00. Interface indicates the virtual volume interface type such as SCSI, NFS, and CIFS. Sub area indicates the number of sub areas in the virtual volume. A sub area may be a certain area of block address, cylinders, file, and/or directory. Volume type may be different between each sub area. In this case in the example of FIG. 4, each sub area has the same volume type. For example, Volume 00 117 (FIG. 3) (with ID 00) is a static synchronous volume type as mentioned previously. Remote Site indicates an identifier of the remote site (e.g., the identifier of service provider site 102). This may be the IP address of an http address. Remote ID indicates volume ID in a service provider site. For example, Volume 10 121 in service provider site 102 has a remote ID 10. Volume type indicates a type of volume such as static or cached, synchronous or asynchronous. Service indicates a service provided by the service provider such as a back up service or an analyze service. When a service provider provides an analyze service, the service provider sets a pointer to a statistical information 113 (FIG. 2) and creates statistical information (access log) 114 to obtain a data feature. If an analyze service is provided, then "Ptr" will be indicated in the Analyze section in the Configuration Table 112 as shown in the example of FIG. 4. For example, Volume 02 119 (ID 02) in Configuration Table 112 has a pointer Ptr in the Analyze section (see row 400). This pointer for ID 02 (of Volume 02 119) points to ID 02 in the Statistical Information 113 in FIG. 5. ID 02 has a Sub area (directory) "/usra" (see row 500) with a pointer ("ptr") in the Log Ptr section. This pointer (ptr) points to the access log 114 which is an access log created for Volume 02 119 in the example of FIG. 6.

It is further noted that in the example of FIG. 5, the ID 02 (of Volume 02 119) includes a directory "/usrb" (see row 505) with a "Null" value (no pointer) in the Log Ptr section. Additionally, ID 02 includes a directory "/usrc" (see row 510) with a Null value (no pointer) in the Log Ptr section. Thus, no associated access logs 114 have been created for the directories /usrb and /usrc since these directories do not have pointers that point to an access log.

In the Configuration Table 112, Size indicates total memory size (Total) in gigabytes, used size (Used), and free size (Free). If a volume is not in the file system in local storage 106, then only the total size needs to be known. The parameter Policy indicates a schedule for synchronization. For example, in row 410, the Volume 00 117 (with ID 00) has a "null" value set in the Policy parameter in FIG. 4, and this null value indicates that a synchronization schedule has not been set for Volume 00 117. Volume 02 119 (with ID 02) has a "week" value set in the Policy parameter, and this value indicates that the data in Volume 02 119 is synchronized once per week with data in a service provider site (e.g., site 102). Volume 03 120 (with ID 03) has a "day" value set in the Policy parameter, and this value indicates that the data in Volume 03 120 is synchronized daily with data in a service provider site (e.g., site 102).

The parameters in the Configuration Table 112 are set by setting the configuration data in the Configuration Table 112. Each storage subsystem has an associated Configuration Table.

FIG. 5 is a block diagram showing an example of statistical information 113 in accordance with an embodiment of the present invention. When a user or service provider sets the Service-Analyze parameter to "Ptr" in the Configuration Table 112 (FIG. 4), then the following will be enabled. The local storage 106 collects the user statistical access information of local storage 106 in this table of Statistical Information 113. The Statistical Information is configured with "ID", "Sub Area", "IO/s" and "MB/s" (Read Ave, Max, Write Ave, Max), "Hit Ratio", and "Log Ptr". The parameters ID and Sub area (in FIG. 5) have the same meanings as ID and Sub area in Configuration Table 112 (FIG. 4). IO/s indicates the number of host/user input or output activities per second such as read and write commands per second. A read or write access in a volume or in a volume directory may be recorded by use of any suitable known methods.

MB/s indicates number of bytes per second. The local storage 106 collects each read and write occurrence in a volume (or in a sub area in a volume), and averages (Ave) this occurrences. The local storage 106 also tracks the maximum occurrence (Max) of read and write occurrence in a volume or in a sub area in a volume.

Hit Ratio indicates a hit ratio of local storage. This hit ratio is, for example, only just for the local disk 209 (FIG. 2). A hit ratio is defined in equation (1):

$$\text{Hit ratio}=100\%(\#\text{LOCAL DISK READ}/\#\text{ALL READS}) \quad (1)$$

where #LOCAL DISK READ is the number of reads in the local disk 209 by a host, and #ALL READS is the number of total reads by the host.

Statistical Information 113 is sent to the service provider sites 102 and/or 103 periodically. The service provider analyzes the feature of data, and from this analysis the service provider can propose better solutions to the user of a host at the user site 101.

As stated above, Log Ptr indicates a pointer to the access log 114. If the service provider wants to know more detail of user access patterns, then the service provider can set this pointer to a created access log 114.

FIG. 6 is a block diagram showing an example of an access log 114 in accordance with an embodiment of the present invention. When the service provider wants to analyze the details of a user's access pattern, then the service provider creates an access log 114 and sets a pointer at Log Ptr (in Statistical Information 113 in FIG. 5) to this access log 114. The local storage 106 collects an access log 114 of each access by a user. This access log 114 is configured with the parameters: "Date", "Time", "Command", "File ID", "Address", and "Size". Date indicates the date of an access by a user. Time indicates the time of an access. Command indicates the command type (e.g., read or write) of an access. File ID indicates the identification of a file that was accessed by this command. If access log is for SCSI, the File ID may be null. Address and size indicates the access address and size.

Read Process

In the read procedure, the cached device (local storage 106) acts as cache. The hosts 104 and/or 105 access the local storage 106, since the local storage 106 has a large space. At first, a host (e.g., host 104 or host 105) issues a read command of NFS, CIFS, or iSCSI protocol via LAN 108 (FIG. 1), or a read command of SCSI protocol via SAN 107. The local storage 106 receives the read command via LAN I/F 204 or SAN I/F 203 (FIG. 2). The device driver 219 (FIG. 2) handles this read command from a host and places this read command into the scheduler 220. The scheduler 220 then analyzes the read command and places the read command into a proper server (NFS server 214, CIFS server 215, or SCSI server 216) within the server programs 213 for purposes of processing the read command. Each server program 213 checks whether the data requested by the read command is in or not in the cache data 212 (FIG. 2). If all data (which is requested by the read command) is in the cache data 212, then the local storage 106 returns data to the requesting host (host 104 or 105) via internal bus 202 and a network interface (SAN I/F 203 or LAN I/F 204). On the other hand, if all of or part of the data (requested by the read command) is not in cache data 212, then the requested data should be moved to cache data 212 from the local disk 209 or from the service provider sites 102 or 103.

Figure 7:
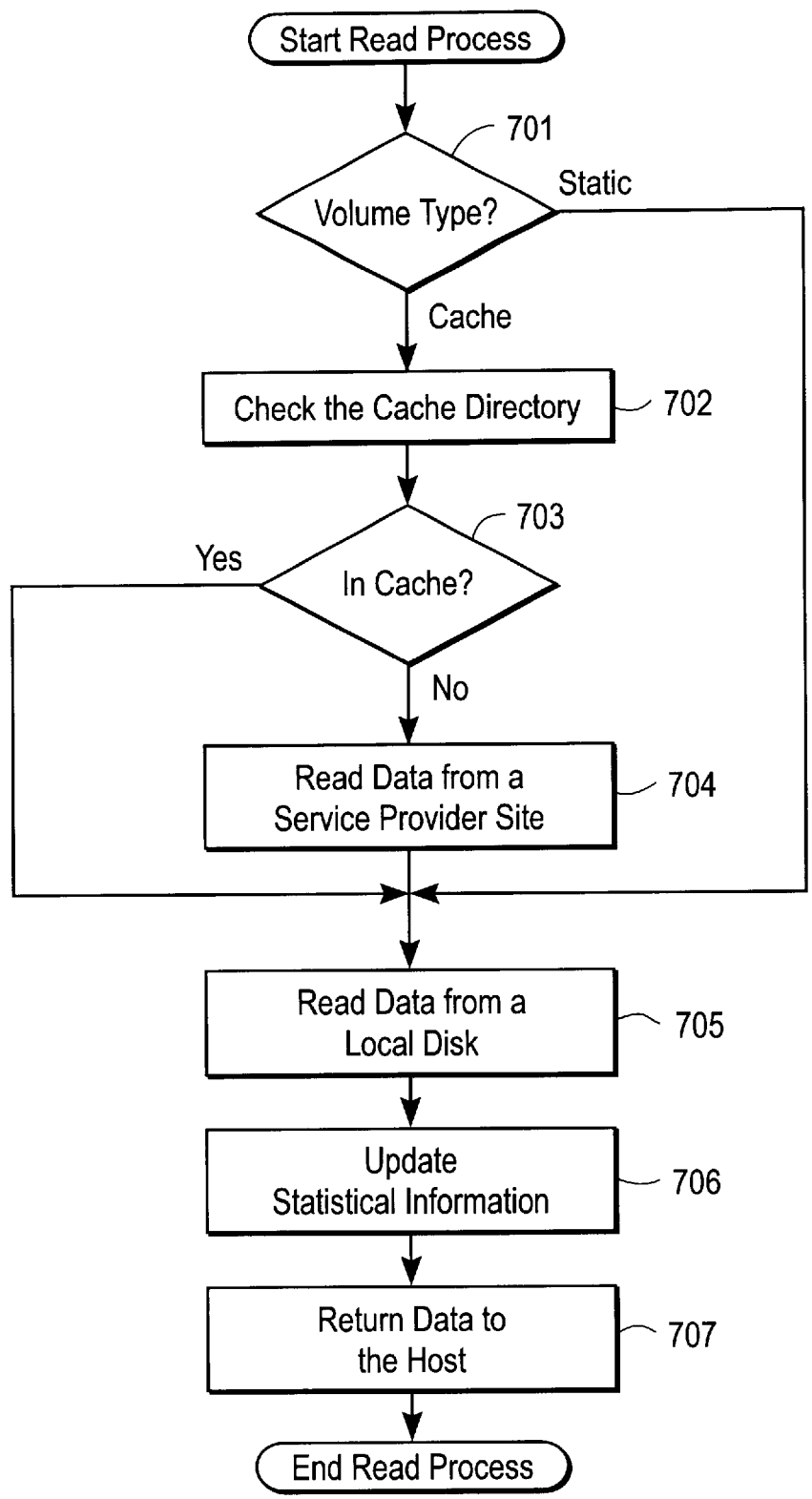
FIG. 7 is a flowchart diagram of a read process in accordance with an embodiment of the present invention.

FIG. 7 is a flowchart diagram of this read process in accordance with an embodiment of the present invention. After the local storage 106 receives a read command from a host (e.g., host 104 or 105), the local storage 106 checks 701 for the volume type of the data. The scheduler 220 checks configuration table 112 for the volume type (e.g., static type) by check a volume ID. In particular, the scheduler 220 (FIG. 2) analyzes the read command to determine the volume type of the data and to determine which server program (server 214, 215, or 216) should process (handle) the read command. The scheduler 220 looks at configuration table 112 (FIG. 4) for the volume type and the appropriate server program to handle the read command. If volume type is a static volume, then the local storage 106 skips the steps 702, 703, and 704 and proceeds to step 705 which is discussed below. If the volume type is a cached volume, then the local storage 106 checks 702 if the data (requested by the read command) is stored in or not stored in the cache data 212.

The local storage 106 checks 703 the cache directory 210. In particular, the appropriate server (214, 215, or 216) in the server program 213 checks whether the data requested by the read command is in or not in the local disk 209. If all data (requested by the read command) is stored in the local disk 209, then the local storage 106 skips step 704 and proceeds to step 705 which is described below. If data (requested by the read command) is not in the local disk 209, then local storage 106 executes step 704.

In step 704, the local storage 106 allocates data area in the local disk 209 and reads data (requested by the read command) from a service provider site (e.g., service provider site 102). In particular, the cache control 218 uses the configuration table 112 (FIG. 4) to determine the service provider site from where data should be obtained. The cache control 218 reads the data from the service provider site and stores the data in the local disk 209.

After data is stored in local disk 209, the local storage 106 will move (read) 705 the data from the local disk 209 to the cache data 212. In particular, the cache control 218 moves the data from the local disk 209 to the cache data 212. The local storage 106 then updates 706 the statistical information 113 (FIG. 5). In particular, the scheduler 220 in the local storage 106 updates the statistical information 113. If the log pointer (Log Ptr) (FIG. 5) in the statistical information 113 is set, then the local storage 106 adds the log data of this read command to the access log 114 (FIG. 6). The scheduler 220 or the device driver 219 creates the statistical information 113 and access log 114. Typically, the scheduler 220 is preferred in creating the statistical information 113 and access log 114.

The data (requested by the read command) is then moved 707 from the cache data 212 to the host (e.g., host 104 or 105) that sent the read command. In particular, the cache control 218 moves the data from the cache data 212 to the appropriate server program (214, 215, or 216), and the appropriate server program (214, 215, or 216) returns the data to the host that sent the read command.

Write Process

In the write procedure, the cached device (local storage 106) acts as a cache. The host 104 and/or host 105 access the local storage 106, since the local storage 106 has a large space. At first, a host (e.g., host 104 or host 105) issues a write command of NFS, CIFS, or iSCSI protocol via LAN 108, or a write command of SCSI protocol via SAN 107. The local storage 106 receives the write command via LAN I/F 204 or SAN I/F 203. The device driver 219 (FIG. 2) handles this read command from a host and places this read command into the scheduler 220. The scheduler 220 then analyzes the write command and places the write command into a proper server (NFS server 214, CIFS 215, or SCSI server 216) within the server programs 213. Each server program 213 checks whether the data of the write command is in or not in the cache data 212 (FIG. 2). If all data (of the write command) is in the cache data 212, then the local storage 106 receives the data from the host via internal bus 202 and a network interface (SAN I/F 203 or LAN I/F 204). The local storage 106 will over write the data on an allocated space in the local disk 209 and cache 212. On the other hand, if all of or part of the data (of the write command) is not in the cache data 212, then the local storage 106 will allocate an area (in local disk 209 and cache data 212) for the rest of data not in the cache data 212. After all of the data area is allocated, then the local storage 106 stores data in that allocated area. When all data is stored in the cache data 212, then the local storage 106 stores data in local disk 209 and sends this data to a provider site (e.g., service provider site 102).

Figure 8:
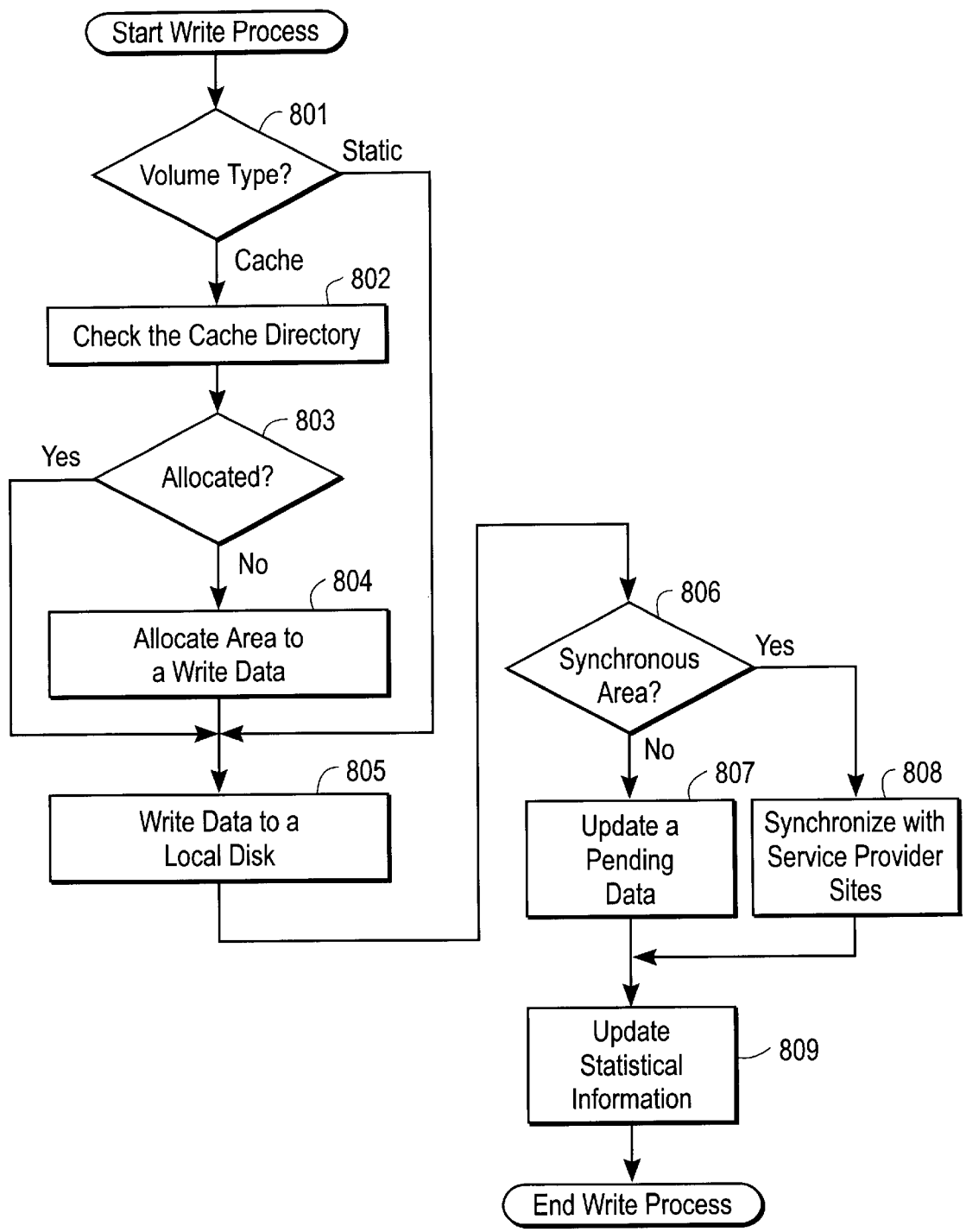
FIG. 8 is a flowchart diagram of a write process in accordance with an embodiment of the present invention.

FIG. 8 is a flowchart diagram of a write process in accordance with an embodiment of the present invention. After the local storage 106 receives a write command from a host, the local storage 106 checks 801 the volume type of the data of the write command. In particular, the scheduler 220 (FIG. 2) analyzes the write command to determine the volume type of the data and to determine which server program (server 214, 215, or 216) should process (handle) the read command. The scheduler 220 looks at configuration table 112 (FIG. 4) for the volume type and the appropriate server program to handle the write command. If the volume type is a static volume, then the local storage 106 skips steps 802, 803, and 804, and proceeds to step 805 which is described below. If the volume type is a cached volume, then the local storage 106 checks if the data (of the write command) is stored or not stored in cache data 212 (FIG. 2).

The local storage 106 checks 802 the cache directory 210 (FIG. 2). In particular, the appropriate server (214, 215, or 216) in the server program 213 checks whether the data of the write command is allocated in the local disk 209. In step 803, if all the data (requested by the write command) is allocated in the local disk 209, then the local storage 106 skips step 804 and proceeds to step 805. In step 803, if the data is not in the local disk 209, then local storage 106 executes step 804.

If the data (of the write command) is not allocated in the local disk 209, then the local storage 106 allocates 804 data area in both the local disk 209 and cache data 212 for the write data. In particular, the cache control 218 allocates the data area on both the local disk 209 and cache data 212.

The local storage 106 then writes 805 the write data to the local disk 209 via the cache data 212. In particular, the appropriate server program (NFS server 214, CIFS server 215, or SCSI server 216) writes the data to the local disk 209.

The local storage 106 checks 806 the volume type in which the data is written by use of the configuration table 112 (FIG. 4). In particular, the server program (NFS server 214, CIFS server 215, or SCSI server 216) uses the configuration table 112 to check for the volume type. If the volume type is a synchronous area, then the local storage 106 immediately synchronizes (writes) 808 the data to a service provider site (e.g., site 102) and proceeds to step 809 which is discussed below. The synchronizer 217 (FIG. 2) performs the synchronizing of the data (in the user site) to the service provider site. The cache control 218 in the local storage 106 knows where the data should be stored in the service provider site by use of the configuration table 112.

In step 806, if the volume type is an asynchronous area, then the local storage 106 updates 807 the pending data list 211 (FIG. 2). In particular, the server program (server 214, 215, or 216) updates the pending data list.

The local storage 106 then updates 809 the statistical information 113 (FIG. 5). In particular, the scheduler 220 updates the statistical information 113. If the log pointer (Log Ptr) (FIG. 5) in statistical information 113 is set, then the local storage 106 adds the log data of this write command to the access log 114. In particular, the scheduler 220 adds the log data of the write command to the access log 114. The write process then ends.

Synchronization Process

In the case of an asynchronous volume write (a data write to an asynchronous area), the data should be sent to a service provider site (e.g., site 102) by a schedule that is defined by the user or service provider. This schedule is, for example, defined by the value in the "Policy" entry in the configuration table 112 in FIG. 4. The scheduler 220 (FIG. 2) executes the synchronizer 217 (FIG. 2) periodically to enable data synchronization with a service provider site. This period may be set to, for example, approximately 1.0 mili-second or 10.0 mili-seconds, depending on the system 100 setting.

Figure 9:
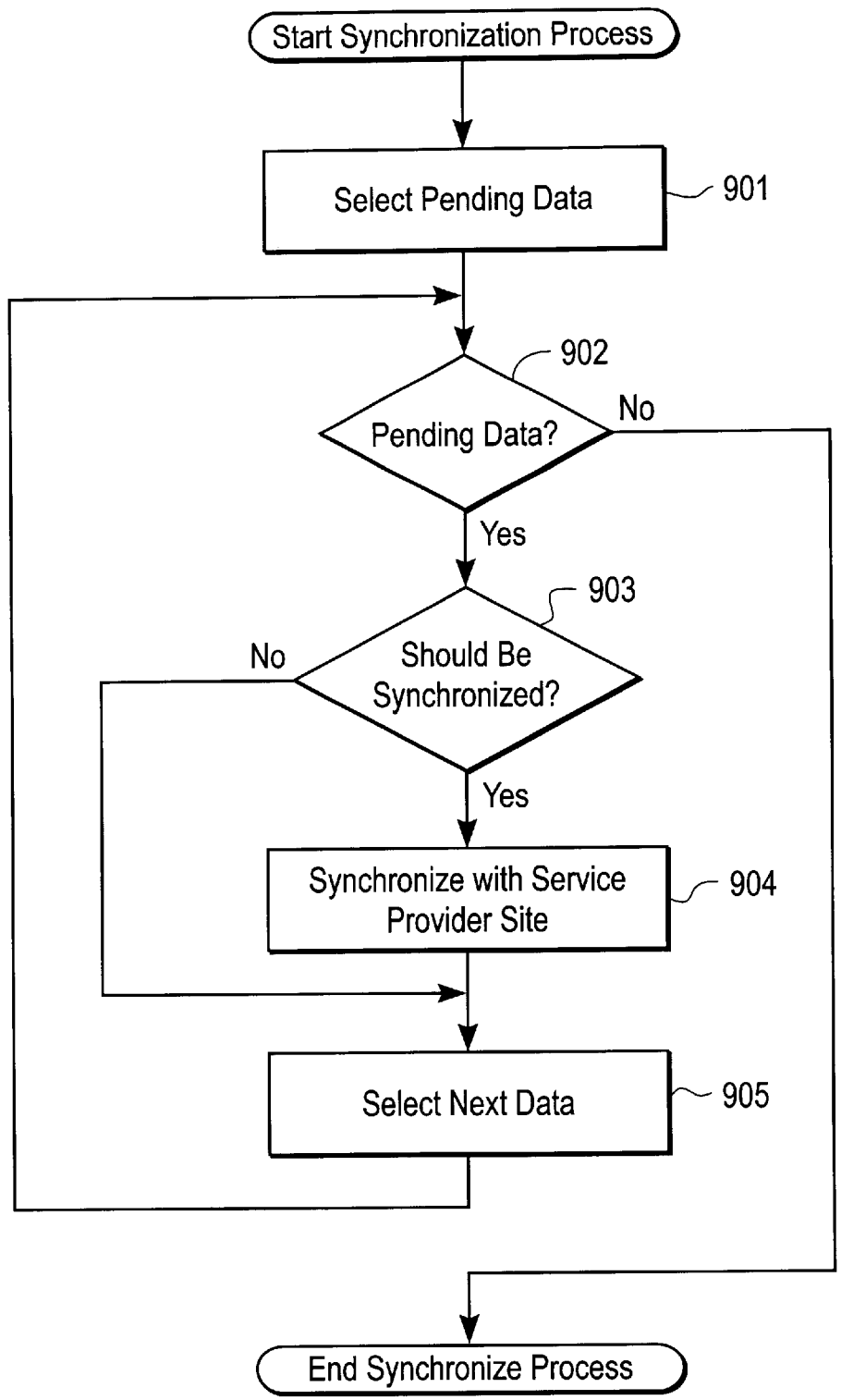
FIG. 9 is a flowchart diagram of a synchronization process in accordance with an embodiment of the present invention.

FIG. 9 is a flowchart diagram of a synchronization process in accordance with an embodiment of the present invention. The synchronization process may be performed by the synchronizer 217 (FIG. 2).

The synchronizer 217 selects 901 the head data in the pending data list 211 (FIG. 2). At the first, the synchronizer 217 checks 902 the pending data list 211. If there is no data in the pending data list 211, then the synchronizer 217 ends the synchronization process. If there is one or more data (in the pending data list 211) which should be synchronized, then the synchronizer 217 executes steps 902–905 as described below.

The synchronizer 217 checks 903 the information of pending data list 211. If this pending data in the pending data list 211 should be synchronized, then the synchronizer 217 sends the pending data to a service provider site (e.g., site 102), so that the pending data is synchronized 904 with the service provider site. The cache control 218 in the local storage 106 knows where data should be stored in the service provider site (e.g., site 102) based upon the values in the Remote ID and Remote Site in the configuration table 112 (FIG. 4).

The synchronizer 217 then selects 905 the next data in the pending data list 211. The synchronizer 217 repeats steps 902 through 905 until there is no more data to select in the pending data list 211. If there is no more data to select in the pending data list 211, then the method of FIG. 9 ends.

It is also within the scope of the present invention to implement a program or code that can be stored in an electronically-readable medium to permit a computer to perform any of the methods described above.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A method of reading data in a data storage system, the method comprising:

receiving a read command from a host to a local storage;

determining the volume type of the data that is requested by the read command;

if the volume type is static, then reading the data from a local disk in the local storage;

if the volume type is cached, then checking if the data is stored in the local disk, if the data is stored in the local disk, then reading the data from the local disk, and if the data is not stored in the local disk, then reading the data from a remote service provider site, storing the data in the local disk, and reading the data from the local disk;

after reading the data from the local disk, updating statistical information relating to the read command; and returning the data to the host.

2. A method of writing data in a data storage system, the method comprising:

receiving a write command from a host to a local storage;

determining the volume type of the data of the write command;

if the volume type is static, then writing the data to a local disk in the local storage;

if the volume type is cached, then checking if the data is stored in local disk, if the data is stored in the local disk, then writing the data to the local disk from a cache, and if the data is not stored in the local disk, then allocating a data area in the local disk and in the cache and then writing the data to the local disk from the cache;

if the volume type is synchronous, then immediately synchronizing the data with a remote service provider site and then updating statistical information relating to the write command; and if the volume type is not synchronous, then synchronizing the data with a remote service provider site based on a predetermined schedule and then updating statistical information relating to the write command.

\* \* \* \* \*